(12) United States Patent
Gunnerud et al.

(10) Patent No.: US 7,100,757 B2
(45) Date of Patent: Sep. 5, 2006

(54) CLUTCH DEVICE UTILIZING A COMPRESSED AIR SOURCE

(75) Inventors: Morten Berger Gunnerud, Kongsberg (NO); Lucien Geoffroy Lénérand, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 0 days.

(21) Appl. No.: 10/487,407

(22) PCT Filed: Aug. 22, 2002

(86) PCT No.: PCT/NO02/00290

§ 371 (c)(1),
(2), (4) Date: Aug. 12, 2004

(87) PCT Pub. No.: WO03/019026

PCT Pub. Date: Mar. 6, 2003

(65) Prior Publication Data

US 2004/0256194 A1    Dec. 23, 2004

(30) Foreign Application Priority Data

Aug. 23, 2001 (NO) ................................. 20014108

(51) Int. Cl.
*F16D 25/08* (2006.01)
(52) U.S. Cl. ..................... 192/86; 192/85 CA
(58) Field of Classification Search .................. 192/86, 192/85 AA, 85 CA, 89.23, 98
See application file for complete search history.

(56) References Cited

U.S. PATENT DOCUMENTS 4,102,446 A    7/1978    Rist
4,479,570 A    10/1984   Kamio
5,069,319 A    12/1991   Makabe (Continued)

FOREIGN PATENT DOCUMENTS

DE    40 13 400 A1    10/1990

(Continued)

*Primary Examiner*—Saul Rodriguez
(74) *Attorney, Agent, or Firm*—Finnegan, Henderson, Farabow, Garrett & Dunner, L.L.P.

(57) ABSTRACT

A clutch device for a vehicle, including a spring device (4), which attempts to force a friction plate (3) in a first direction for engagement of the clutch, a pneumatic actuator (10) with a cylinder (11) and a piston (16), which divides the cylinder (11) into a main chamber (20) and an auxiliary chamber (21), and a compressed air source (31), which is arranged via a controllable valve device (32,33) for communication with the main chamber (20) for movement of the friction plate (3) in a second, opposite direction for disengagement of the clutch. The clutch device includes a computer (50) with a memory (54), wherein there is stored a desired auxiliary force exerted against the release bearing (19) as a second function (C2) of the release bearing's (19) position. The clutch device further includes a sensor (22), which is arranged to establish the release bearing's position, and a sensor (23), which is arranged to establish the pressure of the air in the auxiliary chamber. A valve device (36) can connect the compressed air source (31) with the auxiliary chamber (21), and the computer (50) can receive signals from the sensors (22,23), establish any difference between the measured auxiliary chamber pressure and the desired auxiliary chamber pressure and control the controllable valve device and the valve device (32,33,36) in accordance with the difference and thereby provide the auxiliary force.

5 Claims, 6 Drawing Sheets

U.S. PATENT DOCUMENTS

| | | |
|---|---|---|
| 5,366,054 A | 11/1994 | Cooke et al. |
| 5,893,438 A | 4/1999 | Hasegawa et al. |
| 6,029,789 A * | 2/2000 | Lindner et al. ......... 192/85 CA |
| 6,116,399 A | 9/2000 | Drexl et al. |
| 6,540,059 B1 * | 4/2003 | Drexl .......................... 192/86 |
| 6,827,194 B1 * | 12/2004 | Steinel et al. .................. 192/86 |

FOREIGN PATENT DOCUMENTS

| | | |
|---|---|---|
| GB | 2 314 137 | 12/1997 |
| WO | WO 94/13972 | 6/1994 |

* cited by examiner and COMPRESSED AIR SOURCE

CLUTCH DEVICE UTILIZING A COMPRESSED AIR SOURCE

BACKGROUND OF THE INVENTION

The invention relates to a clutch device for a vehicle, comprising
- a mechanical spring device, which constantly attempts to force a friction plate in a first direction for engagement of the clutch,
- a pneumatic actuator which has a cylinder and a piston, which is movable therein, and which divides the cylinder into a main chamber and an auxiliary chamber,
- a release bearing with a rotating part, which is connected to the friction plate and a rotationally stationary part, which is connected to the piston, and
- a compressed air source, which is arranged via a controllable valve device for communication with the main chamber for movement of the friction plate in a second, opposite direction for disengagement of the clutch.

The prior art that forms the basis for the invention will now be described with reference to FIGS. 1–5.

Clutches of the above-mentioned type may in principle be of a pushing type as illustrated in FIG. 1 or of a pulling type as illustrated in FIG. 2, where a longitudinal direction, i.e. axial direction for the clutch extends between the left and the right edges of the page relative to the reader. For the sake of simplicity, corresponding components of the clutches are indicated by the same reference numerals.

Both clutch types comprise a clutch cover 1, which is connected to a driving flywheel 2 of an engine (not shown). A friction plate 3 is axially movable and rotationally fixed to a driven shaft (not shown), which may be connected to a gearbox of the vehicle. The friction plate 3 is influenced via a pressure plate 3' by a diaphragm spring 4, which constantly attempts to force the friction plate 3 into abutment against the flywheel 2 for rotationally fixed connection of the flywheel 2 with the driven shaft, thus enabling a torque to be transmitted from the flywheel to the driven shaft.

The diaphragm spring has a radially external portion 6, a central portion 7 and a radially internal portion 5, which are engaged with a rotating bearing race 19a of a release bearing 19 (FIG. 4), which is connected to an actuator 10. For the pushing clutch the actuator 10 is arranged to exert a pushing force F against the release bearing 19, i.e. a force that is exerted towards the left in FIG. 1, and for the pulling clutch the actuator 10 is arranged to exert a pulling force against the release bearing 19, i.e. a force that is exerted towards the right in FIG. 2.

It can be seen from FIG. 1 that the radially external portion 6 of the diaphragm spring 4 for the pushing clutch abuts against the pressure plate 3', and that the diaphragm spring is tiltably connected with the clutch cover 1 at its central portion 7 in the same way as a cup spring. The diaphragm spring 4 is hereby pre-tensioned in such a manner that it constantly attempts to move the friction plate into engagement with the flywheel 2.

If the release bearing 19 is moved a distance s, the diaphragm spring 4 is tilted in the clockwise direction about the central portion 7, as indicated by the dotted line, and in such a manner that the radially external portion is moved away from the flywheel 2 and the clutch can be disengaged.

It can be seen from FIG. 2 that the central portion 7 of the diaphragm spring 4 for the pulling clutch abuts against the pressure plate 3', and that the diaphragm spring's radially external portion 6 abuts against the clutch cover in such a manner that the diaphragm spring can tilt about this external portion 6.

If the latter diaphragm spring 4 is influenced by a pulling force F, it is bent outwards a distance s away from the flywheel 2 and tilts in the anticlockwise direction about the external portion 6, with the result that central portion 7 is moved away from the flywheel 2 and the clutch is disengaged.

From these figures it can be seen that radially extending portions of the diaphragm spring for the pushing clutch can be compared to a two-armed lever, while corresponding portions of the diaphragm spring for the pulling clutch can be compared to a one-armed lever.

For an actuator that exerts the same force F against the release bearing, a force K is obtained against the friction plate for both types of clutch.

$K = F \times B/A$, where B is the distance from the release bearing to the tilting location, and A is the distance from the tilting location to the location where the diaphragm spring abuts against the friction plate, on the understanding that this equation illustrates a connection between K and F in the case where the diaphragm spring comprises only mutually independent, e.g. sector-shaped levers. A simplification of this kind, however, illustrates the principle of the mode of operation.

However, since the ratio B/A for the pulling clutch is greater than for the pushing clutch, for a pulling clutch a greater torque can be transmitted from the flywheel 2 to the driven shaft than for a pushing clutch on the assumption that for both clutches the same force is needed against the release bearing in order to disengage the clutch.

For vehicles where large torques are transmitted between the flywheel and the driven shaft, it is therefore advantageous to employ a pulling clutch, whereby the actuator and the force that has to be exerted for operation of the clutch may be relatively small.

In addition to the diaphragm spring, a spring device that influences the friction plate may also comprise other springs (not shown), whose spring force the release bearing also has to overcome during a disengagement of the clutch. A typical spring characteristic for such a spring device, i.e. the force that is exerted by the spring against the release bearing, as a function of the release bearing's travel distance s, is indicated in FIG. 3. This characteristic may be called a first function. Since this force is equal to the oppositely directed force exerted by the release bearing, these forces will be referred to hereinafter as F.

As illustrated in FIG. 3 where this spring characteristic is indicated by thick solid line C1, the force F increases initially during a first distance s1 until it reaches a maximum value, whereupon the force F decreases slightly immediately before the release bearing reaches a position wherein the friction plate 3 no longer abuts against the flywheel. During this distance s1 the clutch is therefore engaged.

This portion s1 is succeeded by a second curve area s2 and a third curve area s3 where the clutch is disengaged, the derivative of the first function, i.e. the spring characteristic, being negative in the area s2 but it may once again be positive in the area s3. Over large portions of the second area s2 the derivative of the first function is numerically relatively large, i.e. for a small travel distance for the release bearing a great change is obtained in the force F.

If the actuator is a hydraulic actuator, good, stable control of the actuator can be obtained by means of a proportional valve during engagement of the clutch despite the large, negative derivative of the first function or the spring characteristic during an engagement of the clutch, since the hydraulic fluid is practically incompressible.

In the case of large vehicles such as lorries and busses, compressed air is used at present for the operation of actuators for other systems in the vehicle, e.g. the braking system, which is advantageous since there is no need amongst other things for any return line leading used fluid back to a reservoir.

The use of a pneumatic actuator and a proportional valve for operation of the clutch presents some difficulties, however, since the engagement of the clutch may be imprecise on account of the substantial, negative derivative of the first function in the second area s2.

Attempts have been made to eliminate this difficulty by means of an additional spring or linearising spring, which provides a more linear, total characteristic together with the diaphragm spring. This linearising spring, however, contributes towards an increase in the total force and must be adapted to suit each individual diaphragm spring's characteristic.

Moreover, the use of a pulling clutch for such large vehicles is advantageous, since the forces that have to be exerted by the clutch actuator via the release bearing may be relatively small.

From WO 94/13972 a pneumatic, pulling clutch actuator is known, where the auxiliary chamber is used only for complete displacement of the piston during assembly or disassembly of the clutch device, or more specifically during a connection of the clutch actuator with the diaphragm spring or release of the clutch actuator from the diaphragm spring. Apart from this application of the auxiliary chamber, it has no function and makes the clutch device complicated and expensive.

An actuator that can be constructed in this way is illustrated in FIG. 4. The actuator 10 comprises an annular cylinder 11 with a radially internal cylinder wall 12 and a radially external cylinder wall 13, which are securely interconnected at their first ends via a first, circular end wall 14. At the second ends of the cylinder walls, a second, circular end wall 15 is sealingly attached to the external cylinder wall. Between the end walls 14, 15 there is mounted in the cylinder 11 a piston 16 with a tubular piston rod 17, which extends sealingly and slidably between the internal cylinder wall 12 and the radially internal end of the second end wall 15. The piston rod is securely connected to an external bearing race 19b of a release bearing 19, whose internal bearing race 19a is arranged for connection with a diaphragm spring 4, which can rotate relative to the actuator 10. The actuator therefore has a through-going, central passage through which can be passed a driven shaft, which can be connected to the friction plate 3, e.g. via longitudinal teeth of the friction plate and the driven shaft respectively.

The piston 16 together with the second end wall 15 and the first end wall 14 define a first cylinder chamber or main chamber 20 and a second cylinder chamber or auxiliary chamber 21 respectively.

For operation of this actuator a valve device 30 may be employed, which is illustrated in FIG. 5, where an actuator 10 is also schematically illustrated.

The valve device 30 comprises a compressed air source 31, a first valve 32 via which compressed air can be supplied to the main chamber 20 for movement of the piston 15 in the direction of the arrow A. For removal of compressed air from the main chamber 20, a second valve 33 is provided. A sensor 22 is provided to establish the position of the piston 15 and thereby the release bearing 19 relative to the cylinder 11. The valves 32 and 33 are used for normal operation of the clutch while the vehicle is running.

In addition, the valve device comprises a third valve 34, via which compressed air can be introduced into the auxiliary chamber 21 for movement of the piston against the direction of the arrow A, thus enabling the actuator 10 to be connected to or disconnected from the diaphragm spring 4. Furthermore, a fourth valve 35 is provided for removal of compressed air from the auxiliary chamber 21. A pressure gauge 23 may also be provided for measuring the pressure of the air in the auxiliary chamber 21.

SUMMARY OF THE INVENTION

In accordance with the invention there is provided a clutch device for a vehicle, comprising a mechanical spring device (4), which constantly attempts to force a friction plate (3) in a first direction for engagement of the clutch and transmission of a torque thereby, a pneumatic actuator (10) which has a cylinder (11) and a piston (16), which is movable therein, and which divides the cylinder (11) into a main chamber (20) and an auxiliary chamber (21), a release bearing (19) with a rotating part (19a), which is connected to the spring device (4) and a rotationally stationary part (19b), which is connected to the piston (16), and a compressed air source (31), which is arranged via a controllable valve device (32,33) for communication with the main chamber (20) for movement of the friction plate (3) in a second, opposite direction for disengagement of the clutch, characterised in that the clutch device further comprises, a computer (50) with a memory (54), wherein there is stored a desired pressure for the air in the auxiliary chamber (21) and thereby a desired auxiliary force exerted against the release bearing (19) as a second function (C2) of the release bearing's (19) position, a sensor (22), which is arranged to establish the release bearing's position, a sensor (23), which is arranged to establish the pressure of the air in the auxiliary chamber, the valve device (36) being arranged to provide a communication between the compressed air source (31) and the auxiliary chamber (21), and the computer (50) is arranged to receive signals from the sensors (22,23), establish any difference between the measured auxiliary chamber pressure and the desired auxiliary chamber pressure and to control the valve device (32,33,36) in accordance with the difference and thereby provide the auxiliary force.

DETAILED DESCRIPTION OF THE INVENTION

The invention will now be described in greater detail with reference to FIGS. 6–9, which schematically illustrate an embodiment of a clutch device according to the invention.

The invention depends firstly on the knowledge that a pneumatic clutch actuator of the known, pulling type with an auxiliary chamber 21 can be employed in a new way, in which the auxiliary chamber 21 can be supplied during operation with compressed air and contribute towards a modification of the spring characteristic in such a manner that the above-mentioned instability during the engagement of the clutch can be avoided.

Figure 1:
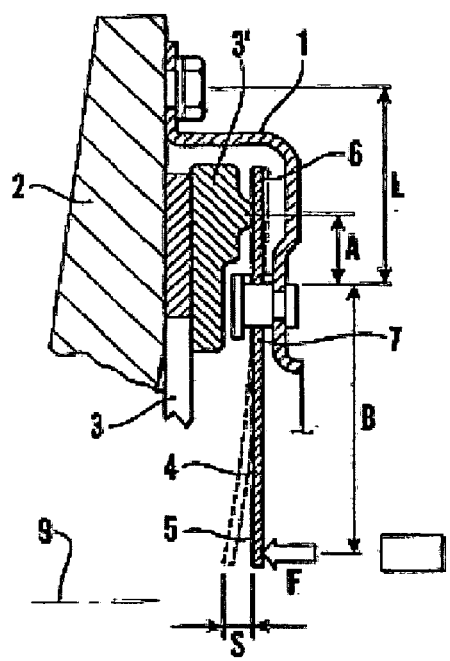
FIGS. 1 and 2 illustrate a longitudinal section though a pushing clutch and a pulling clutch respectively, where components have been removed.
Figure 2:
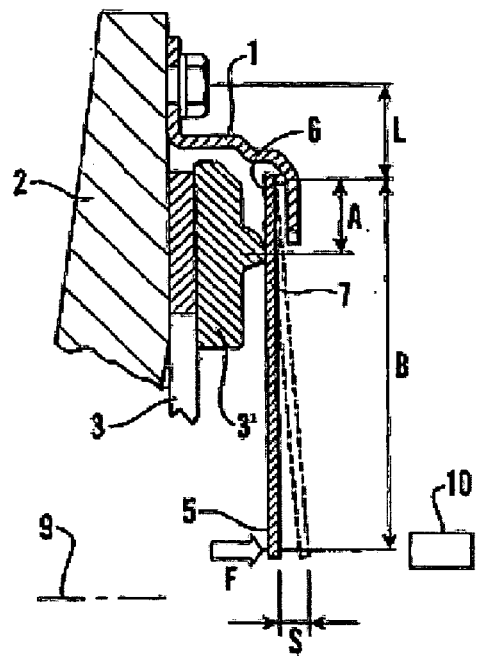
Figure 3:
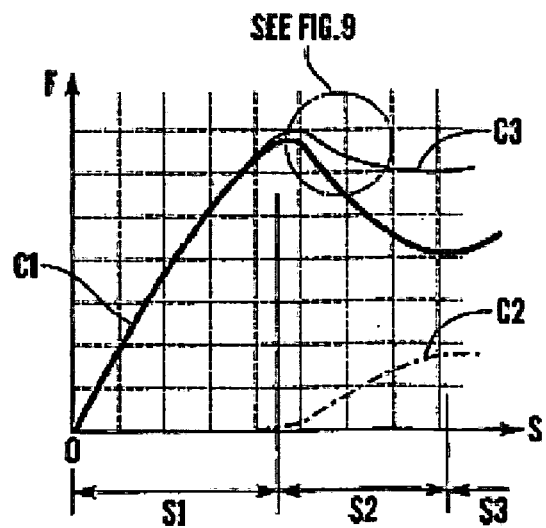
FIG. 3 is a graph illustrating a force F, which is exerted by a spring device against a release bearing during an operation of the clutch, as a function of the release bearing's travel distance.

In more specific terms, this is achieved by enabling the curve C1, which is illustrated in FIG. 3 by a thick, solid line, to be modified in the second area s2 by the introduction of compressed air into the auxiliary chamber 21. The force that is exerted by the compressed air in the auxiliary chamber 21 is a second function of the release bearing's travel path, as illustrated by the dotted curve C2.

The force that is exerted by the compressed air in the auxiliary chamber 21 together with the force that is exerted by the spring device cause the force exerted against the piston by the compressed air in the main chamber to be a third function of the release bearing's travel path as illustrated by the addition of the thin, solid curve C3 in the area s2 and possibly in the area s3 for the release bearing's travel distance to the thick, solid line C1 in the area s1. The new third function is therefore the sum or overlay of the curves C1 and C2. As illustrated in FIG. 3, the derivative of the third function in this area has been increased, whereby a movement of the release bearing over a certain distance here no longer results in such a substantial force change as in the case of the first function. This derivative may be increased to such an extent that it is positive. In general, by means of a suitable, second function, any desired course may be obtained for the third function in this area.

In order to achieve the second function C2 and the third function C3, the clutch device is designed as indicated below.

Figure 4:
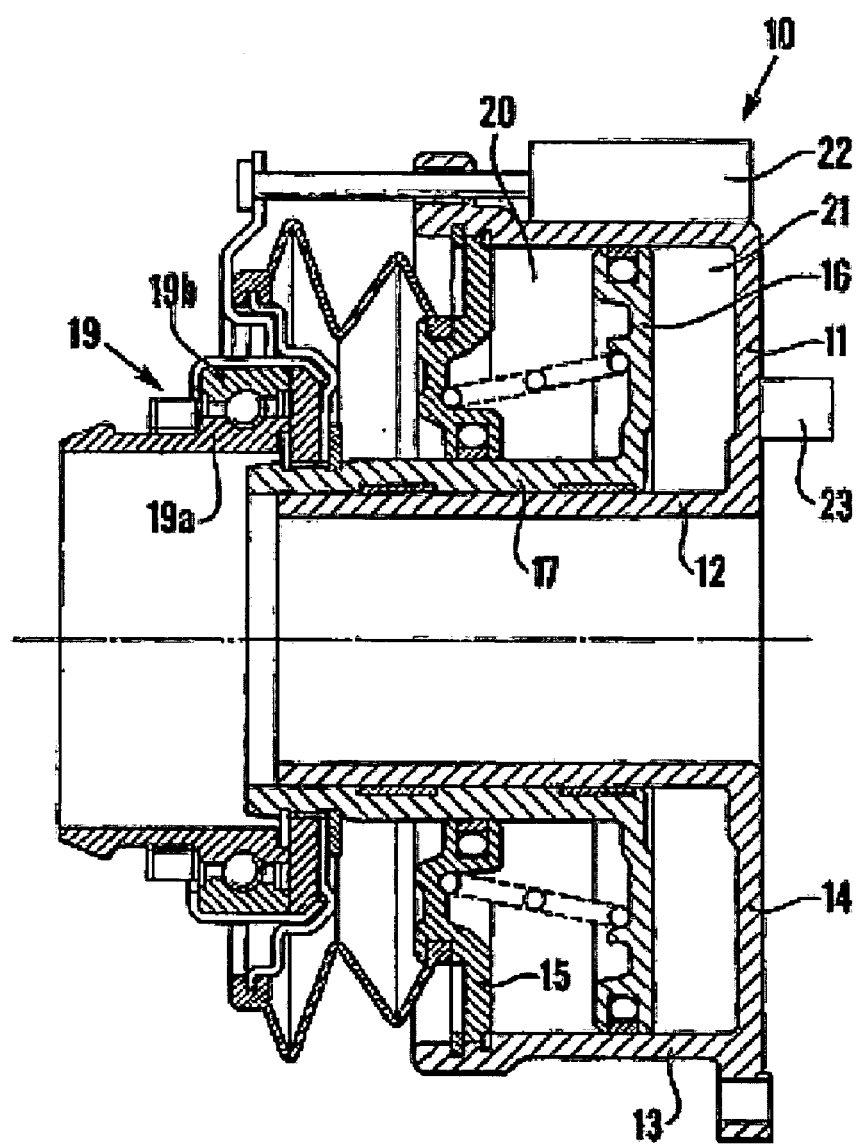
FIG. 4 illustrates a cross section through a pneumatic coupling actuator for a pulling clutch.
Figure 5:
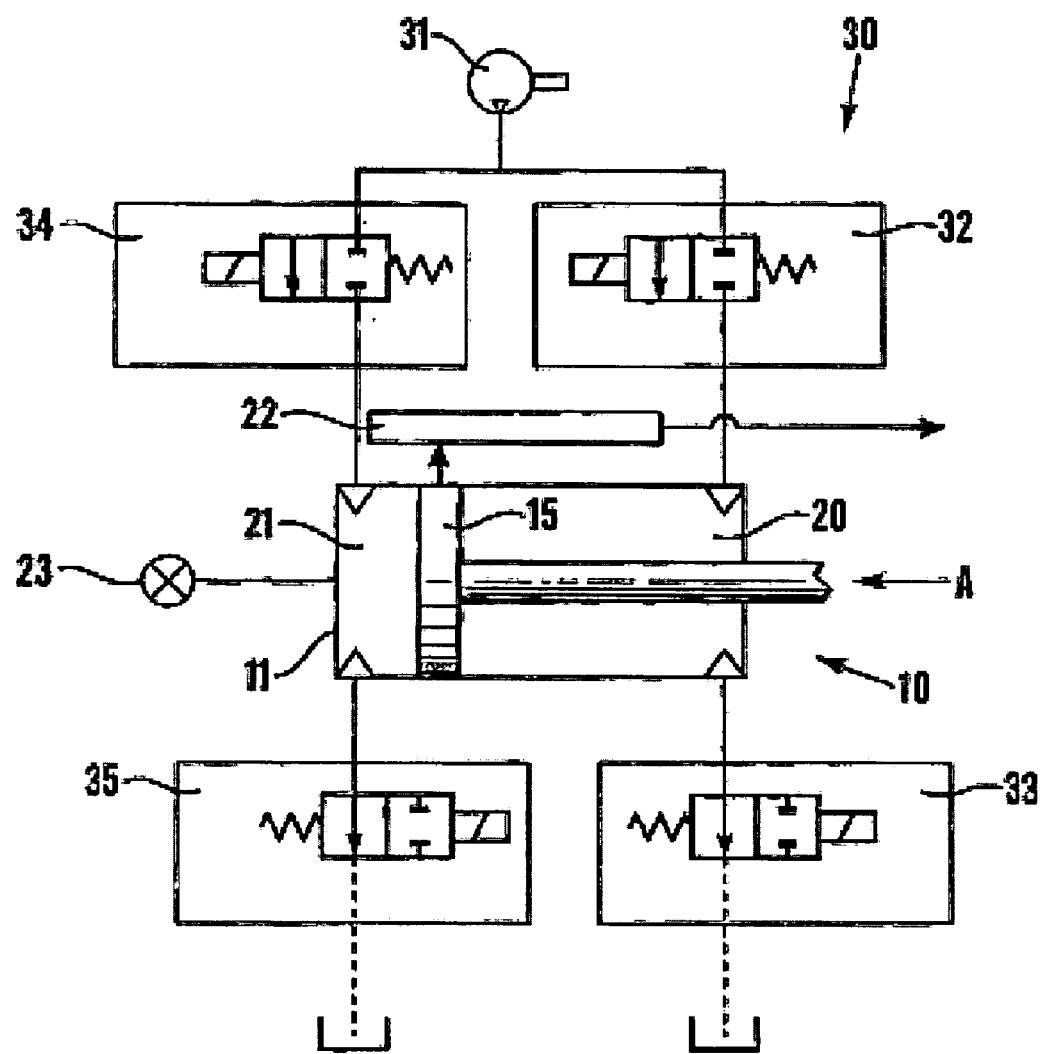
FIG. 5 is a connection diagram for a valve device for controlling the coupling actuator illustrated in FIG. 4.

As illustrated schematically in FIG. 4, a first sensor 22 may be attached to the cylinder 11, whereby the axial position of the release bearing 19 can be established relative to the cylinder 11, i.e., a position along the s-axis in FIG. 3. A second sensor 23 may also be mounted on the cylinder 11 in order to establish the pressure of the air in the auxiliary chamber 21.

Figure 6:
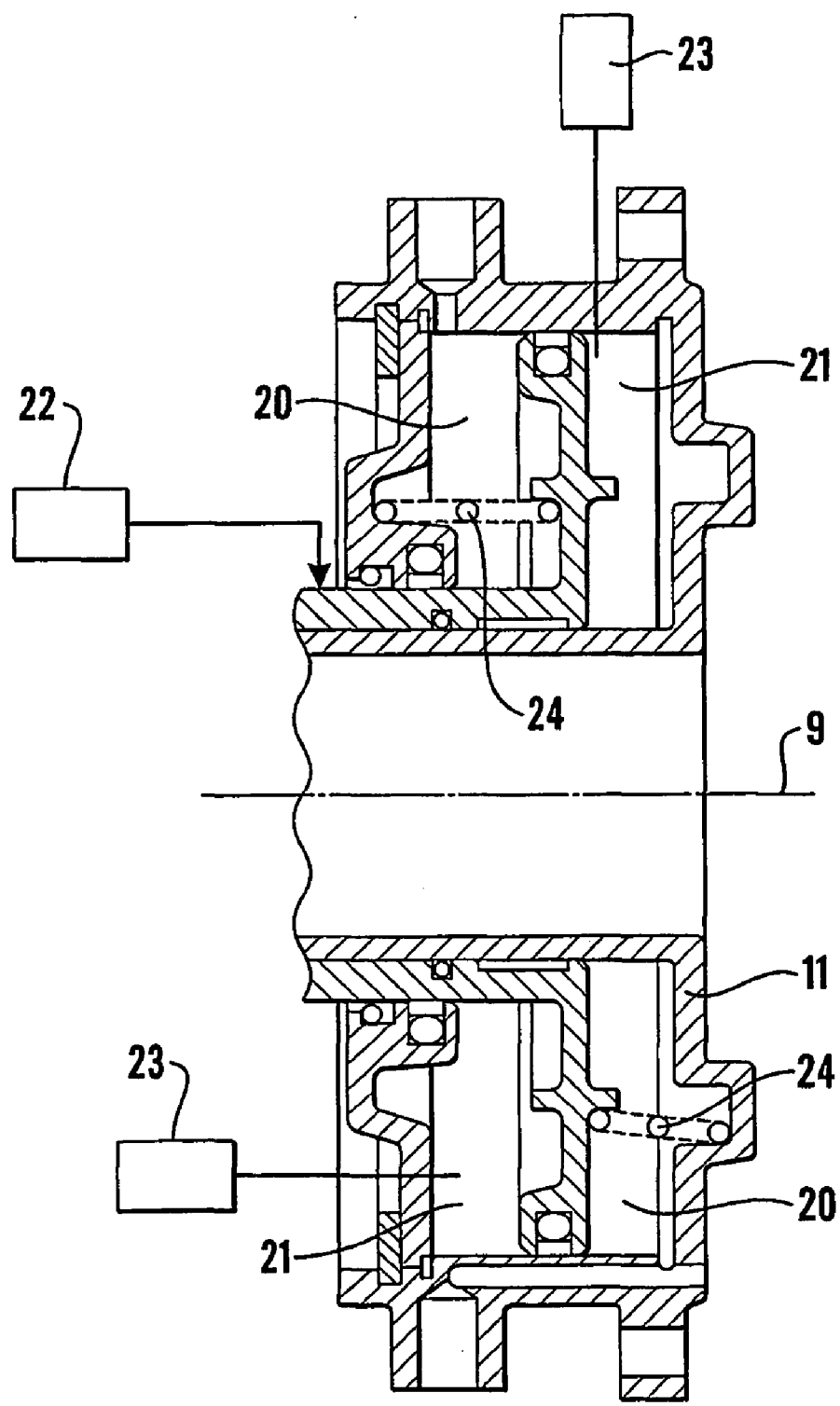
FIG. 6 illustrates a cross section through a pulling and a pushing pneumatic actuator, where a half of the pulling actuator is illustrated over the longitudinal axis 9 and a half of the pushing actuator is illustrated under the longitudinal axis 9.

Since it is advantageous for the release bearing to be pre-tensioned, thus ensuring that the rotating bearing race 19a always rotates during operation of the vehicle, in the main chamber 20 a weak spring 24 may be mounted, which constantly attempts to disengage the clutch (FIG. 6).

As illustrated in FIG. 6, a clutch actuator of this type may be designed in such a manner that it can be used for pulling clutches as well as for pushing clutches, the spring 24 being mounted in the chamber that forms the main chamber 20 for the clutch in question. This may result in a reduction in the price of the clutch actuators and a reduction in stock.

Figure 7:
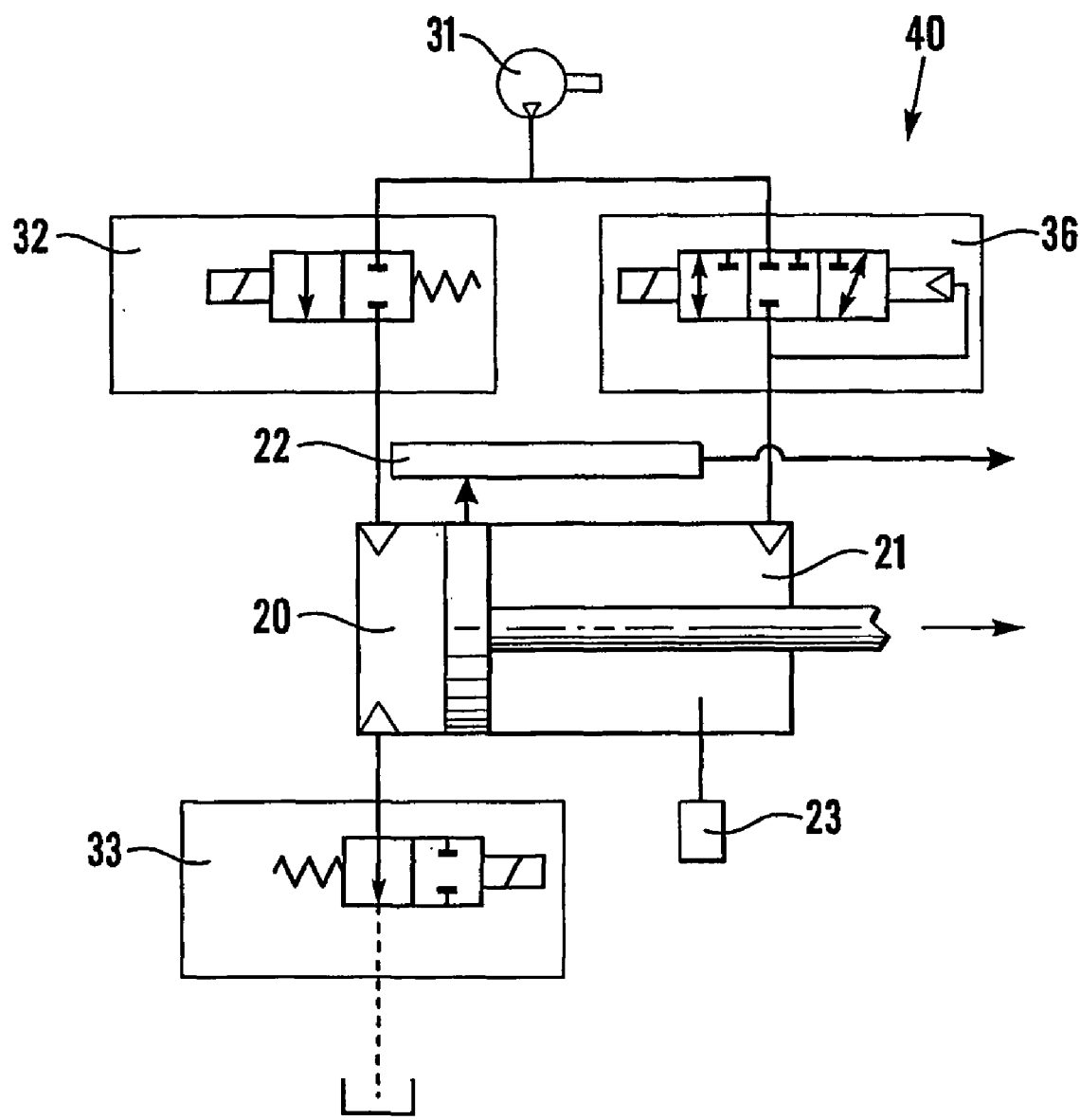
FIG. 7 is a schematic connection diagram for a valve device for a pushing clutch.

In FIG. 7 a valve device 40 is illustrated for a pushing clutch device according to the invention.

As illustrated in this figure, a compressed air source 31 is provided from which compressed air can be supplied to the actuator's main chamber 20 via a first valve 32. Air from the main chamber 20 can be removed via a second valve 33. Air can be introduced into the auxiliary chamber 21 via a combined inlet and outlet valve 36. In this actuator device too a first sensor 22 is provided for measuring the release bearing's position and a second sensor 23 for measuring the pressure of the air in the auxiliary chamber 21. Return air from the chambers can be released into the environment.

Figure 8:
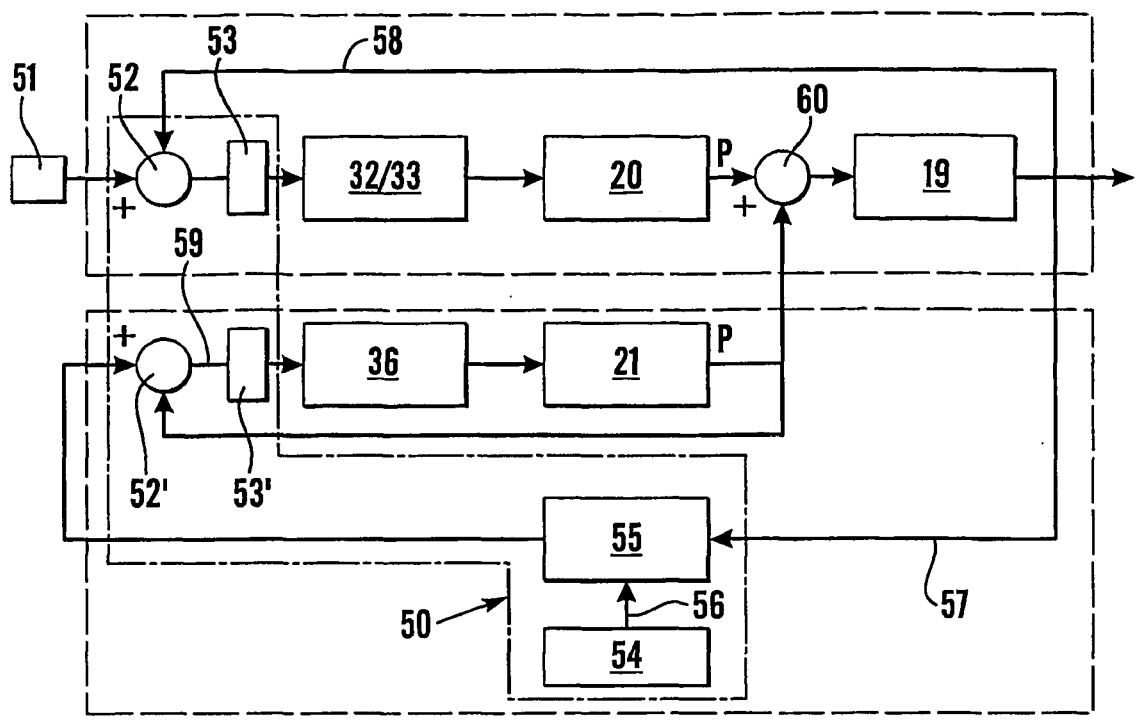
FIG. 8 is a schematic functional diagram for a valve device according to the invention.

As illustrated in FIG. 8 the valve device 30, 40 may be controlled by a computer 50.

The computer 50 is supplied with a signal from a sensor 51, which indicates the position of a clutch operating body, such as a clutch pedal, this signal indicating a desired position for the clutch, i.e. the position s of the release bearing 19. Furthermore, the computer 50 is supplied with a signal from the sensor 22 via a cable 58 in order to establish the actual position of the release bearing 19. These signals are supplied to a comparator 52, which compares the desired position of the release bearing with its actual position and transmits a difference signal to a valve control unit 53, which transmits a control signal to the valve device 40 for the supply or removal of compressed air to and from the main chamber 20 via the valves 32 and 33.

The computer has a memory 54, in which is stored the clutch device's spring characteristic C1 and a unit 55, which is supplied via cables 56 and 57 with signals concerning the spring characteristic and the actual release bearing position, and which can compute a desired pressure of the air in the auxiliary chamber 21. This desired pressure is computed in a comparator 52', which passes on information concerning the pressure to a valve control unit 53', which via a cable 59 transmits a control signal to the valve 36 of the valve device 40, which provides this pressure in the auxiliary chamber 21.

In FIG. 8 the reference numeral 60 symbolically indicates that the main chamber 20 and the auxiliary chamber 21 provide a resulting force against the piston 16 in order to achieve the second function C2, and thereby finally achieve the third or resulting function C3 for the force against the release bearing 19 as a function of its travel distance s.

Figure 9:
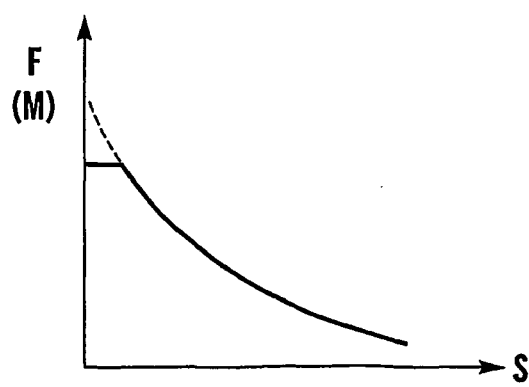
FIG. 9 is a graph illustrating the force and thereby the moment that is transmitted from the flywheel to the friction plate as a function of the release bearing's position.

FIG. 9 is a graph indicating the force and thereby the torque that can be transmitted from the flywheel 2 to the friction plate 3 as a function of the travel distance s of the release bearing 19 calculated from its position when the clutch is engaged.

As can be seen from the curve illustrated by a solid line, the maximum transmittable force or torque is indicated by the portion of the curve that extends parallel to the abscissa. This moment may be less than the maximum torque that an engine of the vehicle can exert, e.g. 90% thereof. In order for the clutch to still be capable of transmitting this moment, compressed air may be introduced into the clutch actuator's auxiliary chamber 21, thus causing the release bearing to press the friction plate against the flywheel with a force that is indicated by the dotted line in the figure. Since there is only relatively seldom any need for this maximum force, for most of its operating time the clutch will function in the area of the graph that is indicated by a solid line and without the need for any additional force. The clutch springs can therefore be designed for a smaller torque and the clutch will be smaller and less expensive.

For this purpose a sensor may be provided which is arranged, e.g. to establish whether a maximum torque requires to be transmitted. The sensor may be arranged, e.g. to establish the additional admission or throttle or the torque that is exerted by the motor's drive shaft. Signals from the sensor with information on the exertion of such a maximum torque may be transferred to the computer, which on the basis of this information controls the valve control unit 53' in order to provide an increased pressure in the air in the auxiliary chamber, whereby the pressure plate 3' is pressed harder against the friction plate 3 and the maximum torque can be transmitted.

Even though it is indicated above and illustrated in the drawing that the clutch actuator is concentric with the driven shaft, it will be understood that the clutch actuator may instead be mounted beside this shaft, inside or outside a clutch cover, and the actuator's piston may be connected to the release bearing via a lever.

The invention claimed is:

1. A clutch device for a vehicle, comprising a mechanical spring device, which constantly attempts to force a friction plate in a first direction for engagement of the clutch and transmission of a torque thereby, a pneumatic actuator which has a cylinder and a piston, which is movable therein, and which divides the cylinder into a main chamber and an auxiliary chamber, a release bearing with a rotating part, which is connected to the spring device and a rotationally stationary part, which is connected to the piston, a compressed air source, which is arranged via a controllable valve device for communication with the main chamber for movement of the friction plate in a second, opposite direction for disengagement of the clutch, a computer with a memory, in which there is stored a desired pressure for the air in the auxiliary chamber and thereby a desired auxiliary force exerted against the release bearing as a second function of the release bearing's position, a first sensor, which is arranged to establish the release bearing's position, a second sensor, which is arranged to establish the pressure of the air in the auxiliary chamber, and a valve device arranged to provide communication between the compressed air source and the auxiliary chamber, the computer being arranged to receive signals from the first and second sensors, establish any difference between the measured auxiliary chamber pressure and the desired auxiliary chamber pressure and to control the controllable valve device and the valve device in accordance with the difference and thereby provide the auxiliary force.

2. The clutch device according to claim 1, wherein the computer's memory stores the force exerted by the spring device against the release bearing as a first function of the release bearing's position, and the computer is arranged to provide a third function, which in an overlay of the first and the second functions, and which in an area of the release bearing's travel distance where the clutch is disengaged, has a derivative that is increased relative to a derivative of the first function in the same area for the same release bearing position.

3. The clutch device according to claim 2, wherein derivative of the third function is positive in the area.

4. The clutch device according to any one of claims 1–3, wherein the spring device includes a diaphragm spring, the actuator is annular in cross section and the actuator's piston is arranged to influence a radially internal potion of the diaphragm spring.

5. The clutch device according to claim 1, wherein the torque that can be transmitted via the clutch under the influence of only the spring device when the main chamber and the auxiliary chamber of the cylinder of the actuator are not supplied with compressed air is less than a maximum torque, which should be able to be transmitted via the clutch, and the computer is arranged to transmit a signal to a control unit for the valve device that controls the pressure of the air in the auxiliary chamber to increase this pressure and bring about an additional force exerted by the spring device, whereby the total torque that can be transmitted via the clutch can be increased to the maximum moment.

* * * * *

UNITED STATES PATENT AND TRADEMARK OFFICE
CERTIFICATE OF CORRECTION

PATENT NO. : 7,100,757 B2
APPLICATION NO. : 10/487407
DATED : September 5, 2006
INVENTOR(S) : Morton Berger Gunnerude et al.

It is certified that error appears in the above-identified patent and that said Letters Patent is hereby corrected as shown below:

In claim 2, column 8, line 13, "in an overlay" should read --is an overlay--.

In claim 4, column 8, line 24, "potion" should read --portion--.

Signed and Sealed this

Thirtieth Day of January, 2007

JON W. DUDAS
*Director of the United States Patent and Trademark Office*